(12) United States Patent
Marshak et al.

(10) Patent No.: US 8,261,029 B1
(45) Date of Patent: Sep. 4, 2012

(54) DYNAMIC BALANCING OF WRITES BETWEEN MULTIPLE STORAGE DEVICES

(75) Inventors: Marik Marshak, Newton, MA (US);
Mark J. Halstead, Holliston, MA (US);
Michael E. Specht, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 1033 days.

(21) Appl. No.: 11/729,164

(22) Filed: Mar. 28, 2007

(51) Int. Cl.
*G06F 12/00* (2006.01)

(52) U.S. Cl. ........ 711/158; 711/111; 711/112; 711/154; 718/103; 718/104; 718/105; 370/444

(58) Field of Classification Search .......... 711/111–112, 711/154, 158; 718/103–105; 370/444
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,496,908 B1* | 12/2002 | Kamvysselis et al. | 711/162 |
| 6,886,164 B2 | 4/2005 | Meiri | |
| 7,024,528 B2 | 4/2006 | LeCrone et al. | |
| 7,093,250 B1* | 8/2006 | Rector | 718/100 |
| 7,114,033 B2 | 9/2006 | Longinov et al. | |
| 7,114,156 B2* | 9/2006 | Le et al. | 718/103 |
| 7,523,275 B2* | 4/2009 | Zlotnick et al. | 711/162 |
| 2004/0205312 A1* | 10/2004 | Zlotnick et al. | 711/162 |

OTHER PUBLICATIONS

U.S. Appl. No. 09/891,143, Kamvysselis et al.

* cited by examiner

*Primary Examiner* — Arpan P. Savla
(74) *Attorney, Agent, or Firm* — Muirhead and Saturnelli, LLC (57) ABSTRACT

A system for dynamic balancing of writes between multiple storage devices in which Remote Data Facility (RDF) groups may be assigned weights according to a dynamic priority parameter. The dynamic priority parameter provides the ability to control the weight of an asynchronous RDF group compared to that of a synchronous RDF group. Thus, when the same RDF adapter includes a mix of asynchronous RDF groups and synchronous RDF groups, a dynamic balance of the write priorities between the two group types may be obtained.

15 Claims, 9 Drawing Sheets

DYNAMIC BALANCING OF WRITES BETWEEN MULTIPLE STORAGE DEVICES

TECHNICAL FIELD

This application relates to the field of computer storage devices and, more particularly, to transferring data between storage devices.

BACKGROUND OF THE INVENTION

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by the Remote Data Facility (RDF) product provided by EMC Corporation of Hopkinton, Mass. With RDF, a first storage device, denoted the "primary storage device" (or "R1") is coupled to the host. One or more other storage devices, called "secondary storage devices" (or "R2") receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link, a Fibre Channel link, and/or a Gigabit Ethernet link. The RDF functionality may be facilitated with an RDF adapter (RA) provided at each of the storage devices.

There may be a number of different types of RDF transmission. Synchronous RDF mode allows synchronous data transfer where, after an initial data write from a host to a primary storage device, the data is transferred from the primary storage device to a secondary storage device using RDF. Receipt of the data is acknowledged by the secondary storage device to the primary storage device which then provides a write acknowledge back to the host for the initial data write. Thus, in synchronous RDF mode, the host does not receive a write acknowledge from the primary storage device until the RDF transfer to the secondary storage device has been completed and acknowledged by the secondary storage device.

A drawback to synchronous. RDF transmission is that the latency of each of the write operations is increased by waiting for the acknowledgement of the RDF transfer. This problem is exacerbated when there is a long distance between the primary storage device and the secondary storage device; because of transmission delays, the time delay required for making the RDF transfer and then waiting for an acknowledgement back after the transfer is complete may be unacceptable.

It is also possible to use RDF in an a semi-synchronous mode, in which case the data is written from the host to the primary storage device which acknowledges the write immediately and then, at the same time, begins the process of transferring the data to the secondary storage device. Thus, for a single transfer of data, this scheme overcomes some of the disadvantages of using RDF in the synchronous mode. However, in the semi-synchronous transfer mode, the primary storage device does not acknowledge a second write by a host until a previous transfer is acknowledged by the secondary storage device. Thus, the bottlenecks associated with using RDF in the synchronous mode are simply delayed by one iteration because a second write cannot occur until transfer of previous data has been acknowledged by the secondary storage device.

Another possibility for an RDF system is to have the host write data to the primary storage device and have the primary storage device copy data asynchronously to the secondary storage device in the background. The background copy involves cycling through each of the tracks of the primary storage device sequentially and, when it is determined that a particular block has been modified since the last time that block was copied, the block is transferred from the primary storage device to the secondary storage device. Although this mechanism may attenuate latency problems associated with synchronous and semi-synchronous data transfer modes, a difficulty still exists because there can not be a guarantee of data consistency between the primary and secondary storage devices. If there are problems, such as a failure of the primary system, the secondary system may have stored therein out-of-order changes that make the data unusable.

A solution to this problem, proposed by EMC Corporation, is the Symmetrix Automated Replication (SAR) process, described in U.S. Pat. No. 7,024,528 to LeCrone, et al., which is incorporated herein by reference. The SAR uses logical devices (BCV's) that can mirror standard logical devices. A BCV device can also be split from its standard logical device after being mirrored and can be resynced (i.e., reestablished as a mirror) to the standard logical devices after being split. Thus, a background copy may be performed after a split and before a resync. However, using the SAR process requires the significant overhead of continuously splitting and resyncing the BCVs, as well as the additional storage needed for the BCVs. The SAR process also uses host control and management, which relies on the controlling host being operational. In addition, the cycle time for a practical implementation of a SAR process may be on the order of twenty to thirty minutes, and thus the amount of data that may be lost when an RDF link and/or primary device fails could be twenty to thirty minutes worth of data.

One solution to the above-noted problems is a product by EMC Corporation known as SRDF/A in which data sets are transferred to the secondary array at defined intervals. Using SRDF/A, data to be copied from one storage array to another in chunks that are assigned sequence numbers based on when the data was written by the host. The data chunks are then separately transmitted according to the sequence number. Although the remote copy of the data may not be as current as the primary copy, SRDF/A allows replication of data over considerable distances in a manner that avoids the latency issues of synchronous transfers and has reduced bandwidth requirements. Moreover, data ordering problems associated with other types of remote data synchronous transfers are avoided. The SRDF/A technique is further discussed elsewhere herein.

A system operating with RDF techniques may use combinations of the above-noted operation modes. In implementations using, for example, both synchronous and asynchronous RDF transfer modes, however, problems may occur in determining priority of writes. For example, a weighting system may be used to used to manage workload according to a polling mechanism for selecting an RDF group. An RDF group may be assigned a certain weight according to the length of its local RDF workload queue, which is an evaluation proportional to the workload of that group. Selecting the group for the next write may done in a pseudo-random fashion but controlled such that the tendency is to select a group that has a higher weight. For an example of managing workload according to a weighting system based on queue length, see U.S. Pat. No. 6,886,164 to Meiri, which is incorporated herein by reference. Because of the latency issues described above, priority may be given to synchronous transfers over asynchronous transfers using the weighting system. However, for an RDF system in which both synchronous and asynchronous transfers occur using the same RA, a simple weighting system as described may not efficiently service asynchronous transfers if synchronous transfers are repeatedly received and given priority.

Further, a static weighting system does not address issues involving continually changing workload queues. Using, for example, SRDF/A, queue lengths may quickly and dramatically change in a system such that at the end of one cycle a queue may be empty, but in the beginning of the next cycle, the queue may become very large. Calculating priority only using queue length may therefore result in inefficiencies where, for example, a priority is determined for a queue having a small queue length but, shortly thereafter, and before priority is recalculated, the queue length increases significantly.

Accordingly, it would be desirable to provide a data storage system that efficiently handles requests for data transfers under different transfer modes.

SUMMARY OF THE INVENTION

According to the system described herein, a method for dynamic balancing of data transfer may include identifying a transmission mode group type for each of at least two groups requesting data transfer from a first storage device to a second storage device. A priority weight may be determined for at least one of the at least two groups according to a dynamic priority parameter and information corresponding to the group type of each of the at least two groups, wherein the priority weight corresponds to a priority of servicing a data transfer request. The two groups may include a group having a first group type and at least another group having a second group type different from the first group type. One of the at least two groups requesting data transfer may be a group of a synchronous mode group type and at least another of the at least two groups requesting data transfer may be a group of an asynchronous mode group type. The asynchronous transmission mode group type may include transmission of data chunks, wherein a first chunk of data is transmitted asynchronously following asynchronous transmission of a second chunk of data. The at least two groups requesting data transfer may be serviced by the same adapter on at least one of the first storage device and the second storage device. The dynamic priority parameter may be a scalar value of a logarithmic factor and may be set by a user or an administrator. A queue weight may be determined for each group according to a length of a workload queue. The information corresponding to the group type of each of the at least two groups to may include a ratio of a number of groups of the first type and a number of groups of the second type. Further, the method may include determining if a group of is busy.

According further to the system described herein, computer software, stored on a computer-readable medium may include executable code that identifies a transmission mode group type for each of at least two groups requesting data transfer from a first storage device to a second storage device. Executable code may determine a priority weight for at least one of the at least two groups according to a dynamic priority parameter and information corresponding to the group type of each of the at least two groups, wherein the priority weight corresponds to an order in which a data transfer request is serviced. The two groups may include a group having a first group type and at least another group having a second group type different from the first group type. One of the at least two groups requesting data transfer may be a group of a synchronous mode group type and at least another of the at least two groups requesting data transfer may be a group of an asynchronous mode group type. The dynamic priority parameter may be a scalar value of a logarithmic factor. Executable code may determine a queue weight for each group of the at least two groups according to a length of a workload queue. The information corresponding to the group type of each of the at least two groups, may include a ratio of a number of groups of the first type and a number of groups of the second type. Executable code may determine if a group is busy.

According further to the system described herein, a system for dynamic balancing of writes between multiple storage devices includes a first storage device, a second storage device and at least one processor that determines priority of writes from the first storage device to the second storage device. The processor may identify a transmission mode group type for each of at least two groups requesting a write from a first storage device to a second storage device. Further, the processor may determine a priority weight for at least one of the at least two groups according to a dynamic priority parameter, information associated with groups of the first group type and information corresponding to the group type of each of the at least two groups. The two groups may include a group having a first group type and at least another group having a second group type different from the first group type. One of the at least two groups requesting data transfer may be a group of a synchronous mode group type and at least another of the at least two groups requesting data transfer may be a group of an asynchronous mode group type.

BRIEF DESCRIPTION OF THE DRAWINGS

Embodiments of the system are described with reference to the several figures of the drawings, described as follows.

DETAILED DESCRIPTION OF VARIOUS EMBODIMENTS

Referring now to the figures of the drawings, the figures comprise a part of this specification and illustrate exemplary embodiments of the described system. It is to be understood that in some instances various aspects of the system may be shown schematically or may be shown exaggerated or altered to facilitate an understanding of the system.

Figure 1:
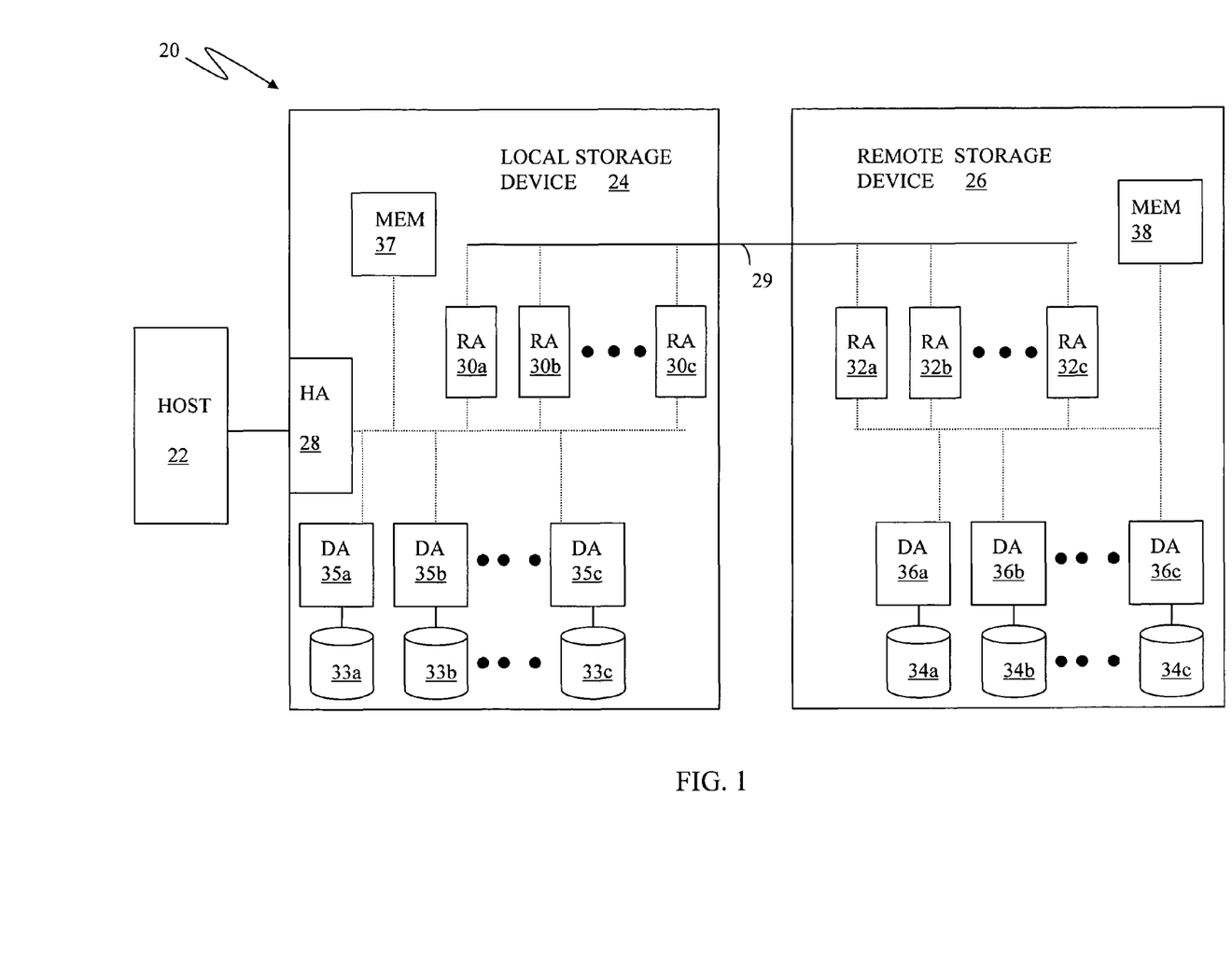
FIG. 1 is a schematic diagram showing a host, a local storage device, and a remote data storage device in connection with an embodiment of system described herein.

FIG. 1 illustrates a system 20 that includes a host 22, a local storage device 24 and a remote storage device 26. The host 22 reads and writes data from and to the local storage device 24 via a host adapter (HA) 28, which facilitates the interface between the host 22 and the local storage device 24. Although the diagram 20 only shows one host 22 and one HA 28, it will be appreciated by one of ordinary skill in the art that multiple HA's may be used and that one or more HA's may have one or more hosts coupled thereto.

Data from the local storage device 24 is copied to the remote storage device 26 via an RDF link 29 to cause the data on the remote storage device 26 to be identical to the data on the local storage device 24. Although only the one link 29 is shown, it is possible to have additional links between the storage devices 24, 26 and to have links between one or both of the storage devices 24, 26 and other storage devices (not shown). Note that there may be a time delay between the transfer of data from the local storage device 24 to the remote storage device 26, so that the remote storage device 26 may, at certain points in time, contain data that is not identical to the data on the local storage device 24. Communication using RDF is described, for example, in U.S. Pat. No. 5,742,792 to Yanai, et al., which is incorporated herein by reference herein.

The local storage device 24 includes a first plurality of RDF adapter units (RA's) 30a, 30b, 30c and the remote storage device 26 includes a second plurality of RA's 32a-32c. The RA's 30a-30c, 32a-32c are coupled to the RDF link 29 and are similar to the host adapter 28, but are used to transfer data between the storage devices 24, 26. The software used in connection with the RA's 30a-30c, 32a-32c is discussed in more detail elsewhere hereinafter.

The storage devices 24, 26 may include one or more disks, each containing a different portion of data stored on each of the storage devices 24, 26. FIG. 1 shows the storage device 24 including a plurality of disks 33a, 33b, 33c and the storage device 26 including a plurality of disks 34a, 34b, 34c. The RDF functionality described herein may be applied so that the data for at least a portion of the disks 33a-33c of the local storage device 24 is copied, using RDF, to at least a portion of the disks 34a-34c of the remote storage device 26. It is possible that other data of the storage devices 24, 26 is not copied between the storage devices 24, 26, and thus is not identical.

Each of the disks 33a-33c is coupled to a corresponding disk adapter unit (DA) 35a, 35b, 35c that provides data to a corresponding one of the disks 33a-33c and receives data from a corresponding one of the disks 33a-33c. Similarly, a plurality of DA's 36a, 36b, 36c of the remote storage device 26 are used to provide data to corresponding ones of the disks 34a-34c and receive data from corresponding ones of the disks 34a-34c. An internal data path exists between the DA's 35a-35c, the HA 28 and the RA's 30a-30c of the local storage device 24. Similarly, an internal data path exists between the DA's 36a-36c and the RA's 32a-32c of the remote storage device 26. Note that, in some embodiments, it is possible for more than one disk to be serviced by a DA and it is possible for more than one DA to service a disk.

The local storage device 24 also includes a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a 33c. Similarly, the remote storage device 26 includes a global memory 38 that may contain tasks that are to be performed by one or more of the DA's 36a-36c and the RA's 32a-32c, and a cache for data fetched from one or more of the disks 34a-34c. Use of the memories 37, 38 is described in more detail elsewhere herein.

The storage space in the local storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 that comprises the disks 34a-34c may be subdivided into a plurality of volumes or logical devices, where each of the logical devices may or may not correspond to one or more of the disks 34a-34c.

Providing an RDF mapping between portions of the local storage device 24 and the remote storage device 26 involves setting up a logical device on the remote storage device 26 that is a remote mirror for a logical device on the local storage device 24. The host 22 reads and writes data from and to the logical device on the local storage device 24 and the RDF mapping causes modified data to be transferred from the local storage device 24 to the remote storage device 26 using the RA's, 30a-30c, 32a-32c and the RDF link 29. In steady state operation, the logical device on the remote storage device 26 contains data that is identical to the data of the logical device on the local storage device 24. The logical device on the local storage device 24 that is accessed by the host 22 may be referred to as the "R1 volume" (or just "R1") while the logical device on the remote storage device 26 that contains a copy of the data on the R1 volume may be referred to as the "R2 volume" (or just "R2"). Thus, the host reads and writes data from and to the R1 volume and RDF handles automatic copying and updating of the data from the R1 volume to the R2 volume. As discussed herein, R1 and R2 may each include one or more data volumes.

Figure 2:
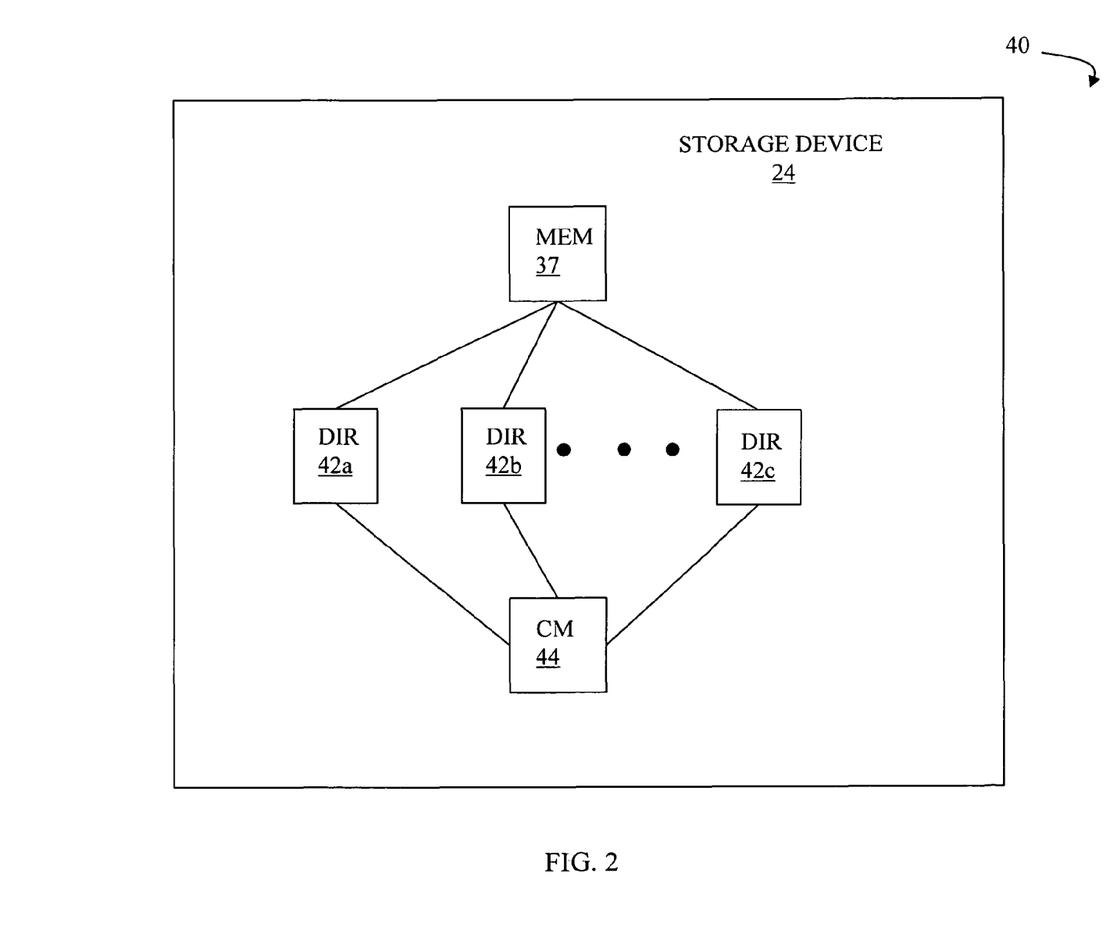
FIG. 2 is a schematic diagram showing a storage device including a plurality of directors coupled to a memory in connection with an embodiment of the system described herein.

Referring to FIG. 2, a diagram 40 illustrates an embodiment of the storage device 24 where each of a plurality of directors 42a-42c may be coupled to the memory 37. Each of the directors 42a-42c represents one of the RA's 30a-30c, the HA 28, and/or the DA's 35a-35c. In an embodiment herein, there may be up to sixty-four directors coupled to the memory 37. Of course, for other embodiments, there may be a higher or lower maximum number of directors that may be used.

The diagram 40 also shows an optional communication module (CM) 44 that provides an alternative communication path between the directors 42a-42c. Each of the directors 42a-42c may be coupled to the CM 44 so that any one of the directors 42a-42c may send a message and/or data to any other one of the directors 42a-42c without needing to go through the memory 37. The CM 44 may be implemented using conventional MUX/router technology where a sending one of the directors 42a-42c provides an appropriate address to cause a message and/or data to be received by an intended receiving one of the directors 42a-42c. Some or all of the functionality of the CM 44 may be implemented using one or more of the directors 42a-42c so that, for example, the directors 42a-42c may be interconnected directly with the interconnection functionality being provided on each of the directors 42a-42c. In addition, a sending one of the directors 42a-42c may be able to broadcast a message to all of the other directors 42a-42c at the same time.

In some embodiments, one or more of the directors 42a-42c may have multiple processor systems thereon and thus may be able to perform functions for multiple directors. In some embodiments, at least one of the directors 42a-42c having multiple processor systems thereon may simultaneously perform the functions of at least two different types of directors (for example, an HA and a DA). Furthermore, in some embodiments, at least one of the directors 42a-42c having multiple processor systems thereon may simultaneously perform the functions of at least one type of director and perform other processing with the other processing system.

Figure 3:
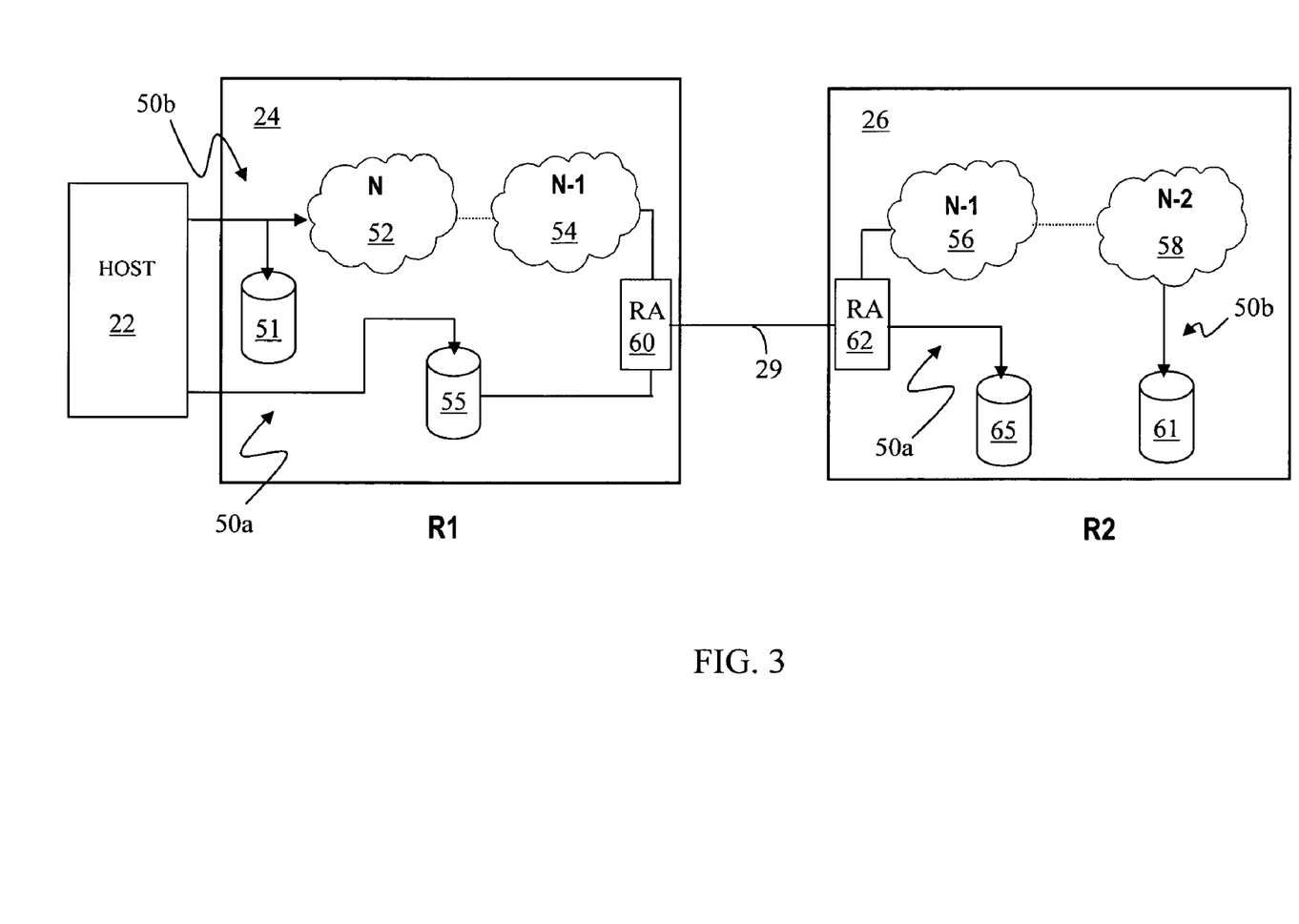
FIG. 3 is a schematic diagram showing data flow paths between a host, a local storage device, and a remote data storage device in connection with an embodiment of the system described herein.

Referring to FIG. 3, data paths 50a, 50b are illustrated from the host 22 to the local storage device 24 and the remote storage device 26. The data path 50a illustrates a synchronous mode data transfer and the data path 50b illustrates an asynchronous mode data transfer in which data is transferred in batches or chunks, as further described herein. As illustrated, the data transfers may be conducted using the same RA 60 at the local storage device 24 and/or the same RA 62 at the remote storage device 26. In connection with various embodiments herein, the system described herein addresses issues that may occur in determining an efficient order for priority of writes between, for example, SRDF synchronous (SRDF/S) and asynchronous (SRDF/A) transfers, particularly when data transfer requests for synchronous SRDF groups and asynchronous SRDF groups are being serviced on the same RA and for efficiently addressing problems involving rapidly changing queue lengths when data is transferred in chunks.

For the synchronous mode data path 50a, data written from the host 22 to the local storage device 24 may be stored locally, for example on data volume 55 of the local storage device 24. After data is written from the host 22 to the local storage device 24, the data is transferred from the local storage device 24 to a remote storage device 26 using RDF. Receipt by the remote storage device 26 is then acknowledged to the local storage device 24 which then provides an acknowledge back to the host 22 for the initial write.

For the asynchronous mode data path 50b, data written from the host 22 to the local storage device 24 may be stored locally, as illustrated by the data volume 51 of the local storage device 24. The data that is written by the host 22 to the local storage device 24 is also maintained by the local storage device 24 in connection with being sent by the local storage device 24 to the remote storage device 26 via the link 29. Note that although separate data volumes are illustrated for the synchronous and asynchronous mode data paths, in some embodiments it is possible that the same data volume is used for storage of data in each transfer mode.

In an embodiment of the asynchronous mode data path 50b, each data write by the host 22 (of, for example a record, a plurality of records, a track, etc.) is assigned a sequence number. The sequence number may be provided in an appropriate data field associated with the write. In the figure, the writes by the host 22 are shown as being assigned sequence number N. All of the writes performed by the host 22 that are assigned sequence number N may be collected in a single chunk of data 52. The chunk 52 represents a plurality of separate writes by the host 22 that occur at approximately the same time.

Generally, the local storage device 24 accumulates chunks of one sequence number while transmitting a previously accumulated chunk (having the previous sequence number) to the remote storage device 26. Thus, while the local storage device 24 is accumulating writes from the host 22 that are assigned sequence number N, the writes that occurred for the previous sequence number (N−1) are transmitted by the local storage device 24 to the remote storage device 26 via the link 29. A chunk 54 represents writes from the host 22 that were assigned the sequence number N−1 that have not been transmitted yet to the remote storage device 26.

The remote storage device 26 receives the data from the chunk 54 corresponding to writes assigned a sequence number N−1 and constructs a new chunk 56 of host writes having sequence number N−1. The data may be transmitted using appropriate RDF protocol that acknowledges data sent across the link 29. When the remote storage device 26 has received all of the data from the chunk 54, the local storage device 24 sends a commit message to the remote storage device 26 to commit all the data assigned the N−1 sequence number corresponding to the chunk 56. Generally, once a chunk corresponding to a particular sequence number is committed, that chunk may be written to the logical volume at the remote storage device. This is illustrated with a chunk 58 corresponding to writes assigned sequence number N−2 (i.e., two before the current sequence number being used in connection with writes by the host 22 to the local storage device 26). The chunk 58 is shown as being written to a data volume 61 representing disk storage for the remote storage device 26. Thus, the remote storage device 26 is receiving and accumulating the chunk 56 corresponding to sequence number N−1 while the chunk 58 corresponding to the previous sequence number (N−2) is being written to disk storage of the remote storage device 26 illustrated by the data volume 61. In some embodiments, the data for the chunk 58 is marked for write (but not necessarily written immediately), while the data for the chunk 56 is not.

Thus, in operation, the host 22 writes data to the local storage device 24 that is stored locally in the data volume 51 and is accumulated in the chunk 52. Once all of the data for a particular sequence number has been accumulated the local storage device 24 increments the sequence number, in a process termed, for example, a cycle switch. Data from the chunk 54 corresponding to one less than the current sequence number is transferred from the local storage device 24 to the remote storage device 26 via the link 29. The chunk 58 corresponds to data for a sequence number that was committed by the local storage device 24 sending a message to the remote storage device 26. Data from the chunk 58 is written to disk storage of the remote storage device 26. For further discussion of handling data writes to a storage device including processes of maintaining circular. linked lists of pointers to cache slots and hash tables to provide correlation between cache slots, see U.S. Pat. No. 7,114,033 to Longinov, et al., which is incorporated herein by reference.

Figure 4A:
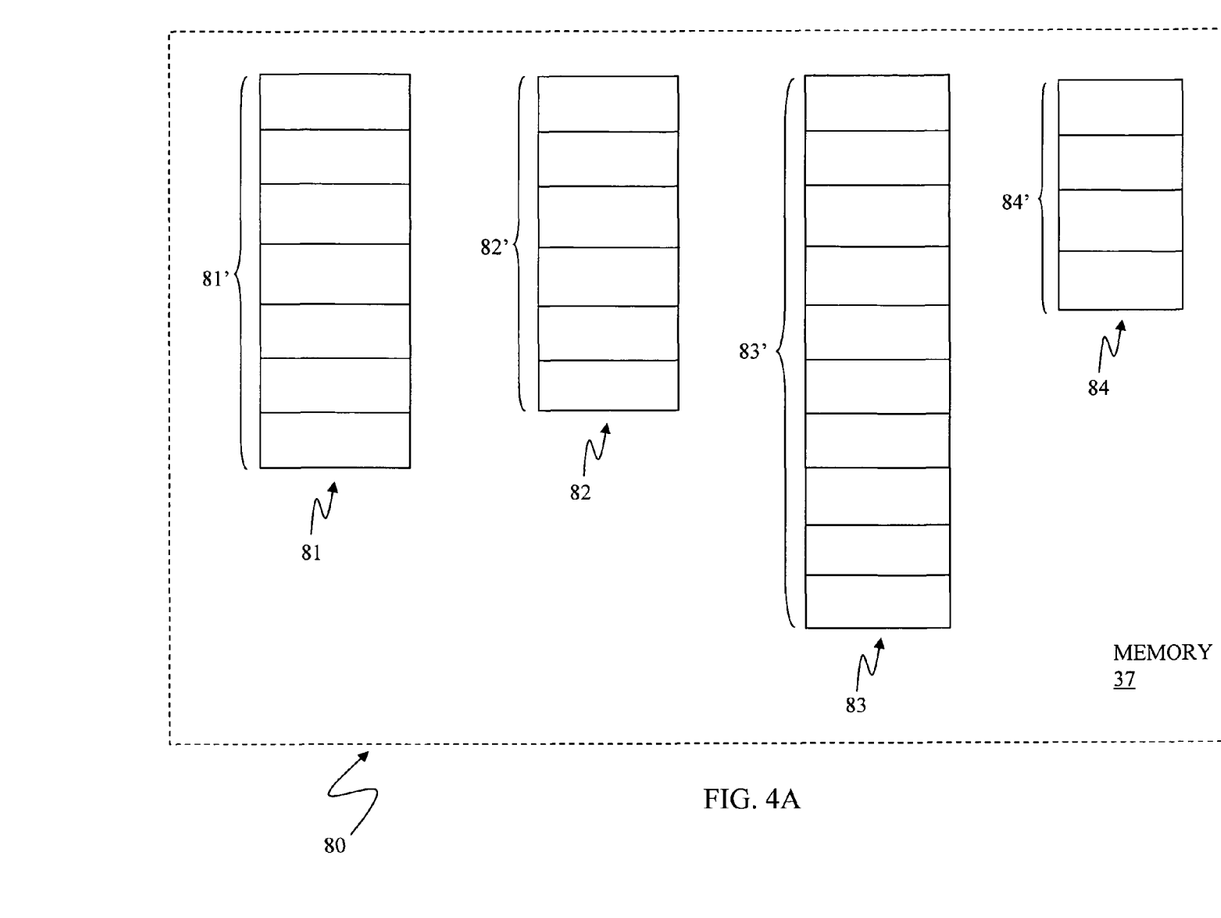
FIG. 4A is a schematic diagram showing workload queues of RDF groups awaiting data transfer to the remote storage device in connection with an embodiment of the system described herein.

FIG. 4A is a schematic diagram of a system 80 showing workload queues 81, 82, 83, 84 corresponding to jobs of RDF groups awaiting data transfer to the remote storage device 26. One or more of the workload queues 81-84 may be maintained for transmission of the inactive cycle data (for example, the data chunk 54) while other ones of the workload queues 81-84 may be maintained for other types of RDF transfer, such as the system transfer illustrated by the path 50a of FIG. 3. The workload queues 81-84 may be stored in global memory 37 (FIG. 1), in a local memory of the RA 60 and/or in another location. In various embodiments, the workload queues 81-84 may correspond to RDF groups of different transfer types, including synchronous, asynchronous, semi-synchronous and/or other transfer modes. The workload queues 81-84 each have a certain queue length 81', 82', 83', 84' of data transfer jobs awaiting execution. In other embodiments, the queue lengths 81'-84' may be other than those specifically shown. As further discussed elsewhere herein, a processor of the RA 60 may control selection processing of a queue according to weighting, selection and/or execution algorithms along with handling transmission of the selected data.

Figure 4B:
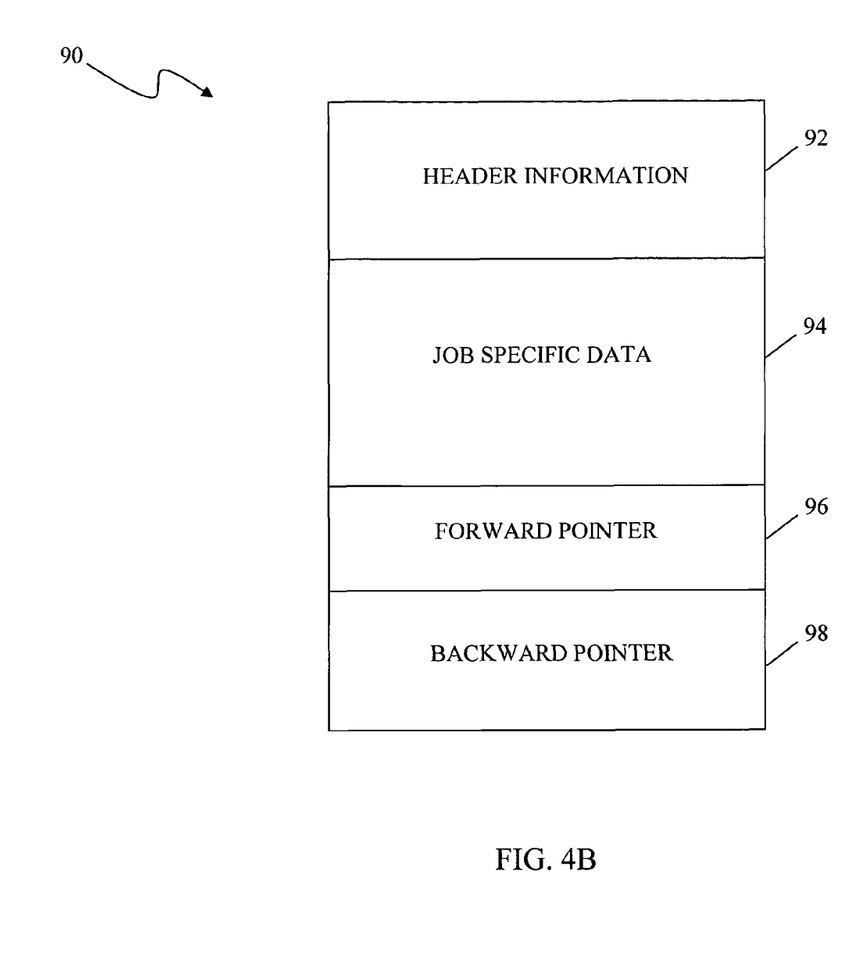
FIG. 4B is a schematic diagram illustrating an example of a job record in a workload queue in connection with an embodiment of the system described herein.

FIG. 4B is a schematic diagram illustrating an example of a job record 90 in a workload queue for the system described herein. The job record 90 is an example of an entry in the workload queues 81-84, although it will be appreciated by one of ordinary skill in the art that any appropriate data structure may be used. Each job that is created may include header information 92, job specific data 94, a forward pointer 96, and a backward pointer 98. The header information 92 includes information used to manage the job and may include information that identifies the particular RA servicing the job, the particular tracks being accessed in connection with the job, and pointer information to a table or record that may keep track of all job information in a queue, such as a total job count, among other information. The job specific data 94 represents data that relates to the specific job and may include a task description and/or the data that is being written/transferred. The forward pointer 96 and backward pointer 98 may be used to create a doubly linked list of jobs that may be used for traversing the jobs within a particular workload queue 81-84. Thus, if one workload queue had four jobs associated therewith, there would be four, somewhat different, instances of the job record 90 all linked together, for example, by the forward and backward pointer fields. Other information and configurations for the job record 90 and corresponding queue management systems are possible. For further discussions of the creation and manipulation of job records and queues, see U.S. Pat. No. 6,886,164 to Meiri and/or U.S. patent application Ser. No. 09/891,143, filed Jun. 25, 2001 to Kamvysselis, et al., which are incorporated herein by reference.

Figure 5:
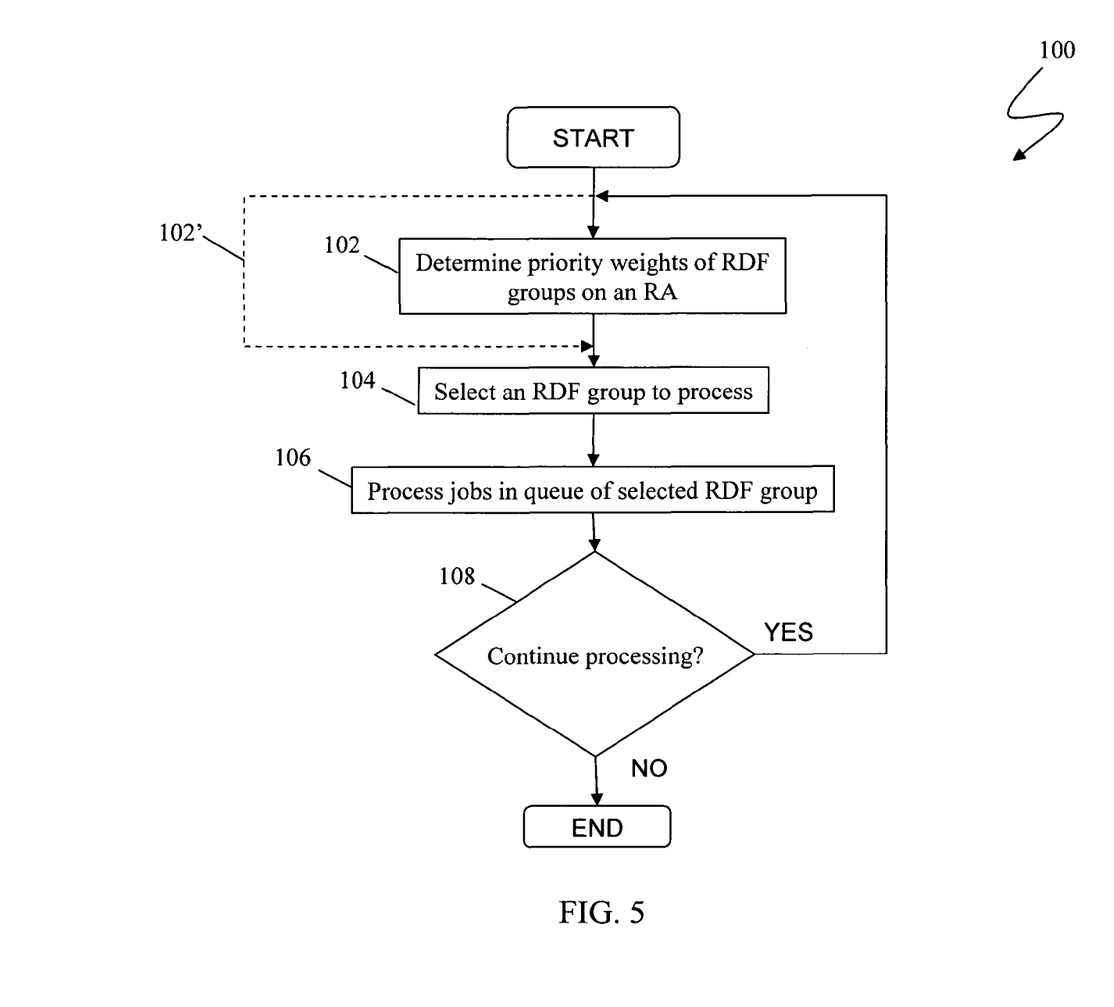
FIG. 5 is a flow diagram showing processing performed by one or more RAs in connection with sending RDF data in an embodiment of the system described herein.

FIG. 5 is a flow diagram 100 showing processing performed by one or more RAs that transmit data from queues of RDF groups that may be stored in global memory 37 according to an embodiment of the system described herein. In various embodiments, each of the RDF groups may be a synchronous group, an asynchronous group, a semi-synchronous group and/or a group with another transfer mode. At a step 102, dynamic priority weights for each of the RDF groups on an RA are determined, as further discussed elsewhere herein. It should be noted that, alternatively, processing may proceed directly to the step 104, as indicated by path 102', indicating that determining of the priority weights may be a step performed separately from the processing of the other steps indicated in the flow diagram 100.

At a step 104, an RDF group is selected for processing. In an embodiment herein, the weights of each of the RDF groups are used in connection with selecting the RDF group for the next write. Selection may done in a pseudo-random fashion but controlled using the determined weights such that the tendency is to select a group that has a higher weight (see, for example, U.S. Pat. No. 6,886,164 to Meiri).

After the step 104, processing proceeds to a step 106, where the workload queue of the RDF group 81-84 (FIG. 4A) that is selected in accordance with the system discussed herein is processed. For example, the first job of a queue may be executed by the system in step 106. Systems and techniques for execution of jobs in a queue is discussed, for example, in U.S. Pat. No. 6,886,164 to Meiri. It should be noted that one or more jobs of a workload queue of the selected RDF group may be executed before performing another selection process for selecting an RDF group (the same or a different RDF group) for processing. For example, one job of the workload queue may be executed, the entire workload queue of jobs may be executed, or some portion of the workload queue may be executed as part of the step 106. After the step 106, at a test step 108, a determination is made whether processing is to continue, where if so, processing proceeds back to the step 102. If no further RDF groups are to be processed (for example, there in no more RDF data to send), then after the test step 108, processing is complete.

In an embodiment according to the system described herein, RDF groups may be assigned weights according to a dynamic priority parameter (DP parameter). The DP parameter provides the ability to control the weight of an asynchronous RDF group (that is, for example, an RDF group for which data transfer involves asynchronous RDF mode transfer of data chunks or data batches, such as by SRDF/A) compared to that of a non-asynchronous RDF group (for example, a synchronous RDF group—SRDF/S). Thus, when the same RA includes a mix of asynchronous RDF groups (SRDF/A) and synchronous RDF groups (SRDF/S), a dynamic balancing of the writes as between the two group types may be obtained according to the system described herein. In an embodiment, the dynamic priority weight of an asynchronous RDF group may be determined by a weighting algorithm, as further discussed herein, and the weight of the synchronous RDF group may be proportional to the length of the workload queue of the RDF group. Once the dynamic priority weights are determined, selection of RDF groups for processing priority may proceed using appropriate techniques (see, for example, U.S. Pat. No. 6,886,164 to Meiri).

In an embodiment, the dynamic parameter weight may be determined based on the DP parameter and may be proportional to the average weight of the synchronous RDF groups and the ratio of the number of synchronous RDF groups to asynchronous RDF groups. The DP parameter may be user-controlled such that the user has the ability to change the balancing between the two types of groups. Alternatively, the DP parameter may be configured by an administrator or may be controlled by other controllers. Each group weight may be defined as follows, as shown by Equation 1:

For a group X:

$$\text{Weight}_{Group\_X} = \text{MAX}(\text{Weight}_{Group\_X,QUEUE}, \text{Weight}_{Group\_X,ASYNC}) \quad \text{EQUATION 1}$$

where, $\text{Weight}_{Group\_X}$ is the weight calculated for group X, $\text{Weight}_{Group\_X,QUEUE}$ is the weight of group X according to length of group X's local workload queue, and $\text{Weight}_{Group\_X,ASYNC}$ is the weight of group X according to asynchronous priority criteria, as further discussed herein.

In an embodiment, $\text{Weight}_{Group\_X,ASYNC}$ may be defined as shown in the following Table 1:

TABLE 1

| $\text{Weight}_{Group\_X,ASYNC} =$ | | |
|---|---|---|
| $0$ EQUATION 2 | | If X is not an asynchronous RDF group OR X is not a busy asynchronous RDF group. |
| $\text{MAX}\left(1, \dfrac{\text{Average\_Weight}_{QUEUE}}{2^{DPparameter_x - 10}} \times \dfrac{\text{\# Asyncgroups}}{\text{\# Syncgroups}}\right)$ EQUATION 3 | | If X is a busy asynchronous RDF group AND the number of synchronous RDF groups $\neq 0$ AND the Average\_Weight$_{QUEUE} \neq 0$. |
| $\text{MAX}\left(1, \dfrac{1000}{2^{DPparameter_x - 10}}\right)$ EQUATION 4 | | If X is a busy asynchronous RDF group AND (the number of synchronous RDF groups = 0 OR Average\_Weight$_{QUEUE}$ = 0). |

Where, an asynchronous RDF group is considered busy if there are more slots in an inactive cycle that correspond to data being transmitted from the local storage device 24 to the remote storage device 26 than in an active cycle in which data is being written from the host in the local storage device 24, as further discussed elsewhere herein, and Average\_Weight$_{QUEUE}$ is the average weight of all synchronous RDF groups in the queue. In an embodiment herein, the weight of a synchronous queue is the length of the workload queue, but other appropriate mechanisms may be used to assign the weight.

In the example described in reference to TABLE 1, three scenarios are described in connection with determining the dynamic priority weight of an asynchronous RDF group. In one scenario, if the group (X) for which the dynamic priority weight is being determined is not an asynchronous RDF group OR the group X is an asynchronous group that is not busy (as discussed elsewhere herein), then the asynchronous weight factor ($\text{Weight}_{Group\_X,ASYNC}$) of the group X is assigned as zero, per Equation 2. Then, using Equation 1 and applying zero as the value for $\text{Weight}_{Group\_X,ASYNC}$, the result of the priority weight calculation for group X is based on length of the workload queue ($\text{Weight}_{Group\_X,QUEUE}$).

In another scenario, if group X is a busy asynchronous RDF group AND the number of synchronous groups does not equal zero AND the average weight of the synchronous groups does not equal zero (Average\_Weight$_{QUEUE} \neq 0$), then Equation 3 is applied. Per Equation 3, the dynamic priority weight may be determined based on the DP parameter and may be proportional to the average weight of the synchronous RDF groups and the ratio of the number of asynchronous RDF groups (SRDF/A groups) to synchronous RDF groups (SRDF/S or other Non-SRDF/A groups). The DP parameter may be controllable as further discussed elsewhere herein. The resulting asynchronous weight factor ($\text{Weight}_{Group\_X,ASYNC}$) from Equation 3 is then applied to Equation 1 to yield the dynamic parameter weight for the asynchronous group X based on the maximum between the weight factor of the group X based on length of the workload queue ($\text{Weight}_{Group\_X,QUEUE}$) and the determined asynchronous weight factor.

In yet another scenario, if group X is a busy asynchronous RDF group and either there are no synchronous RDF groups or the average weight of the synchronous groups equals zero, then Equation 4 is applied. Depending on the default DP parameter setting, as discussed elsewhere herein, the resulting asynchronous weight factor from Equation 4 may indicate a high priority. For example, as further discussed below, for the default setting of 10 for the DP parameter, the above scenario using Equation 4 would generate an asynchronous weight factor of 1000. In this scenario, Equation 4 may be designed to provide a particularly high priority for the group X in view of the identified conditions. Accordingly, the value of 1000 is an example value that may be adjusted as appropriate to provide an asynchronous weight factor with a suitably high priority to be applied to Equation 1.

Figure 6:
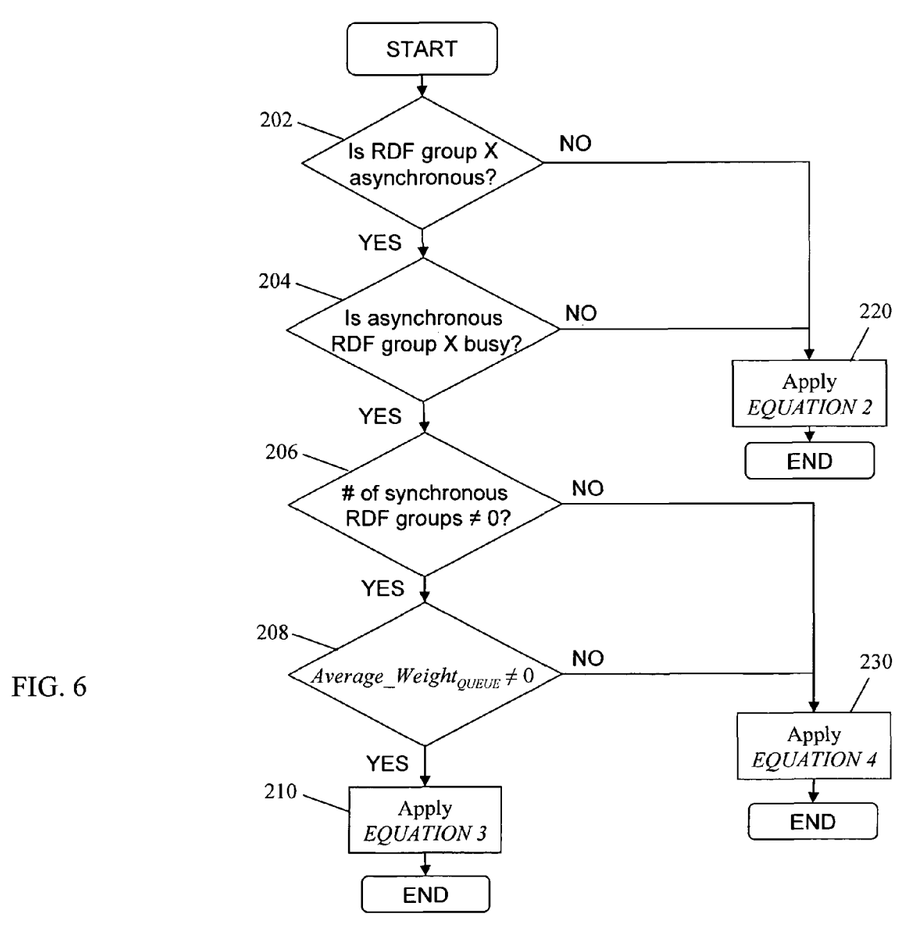
FIG. 6 is a flow diagram illustrating application of various scenarios for determining dynamic priority weight in an embodiment of the system described herein.

FIG. 6 is a flow diagram 200 illustrating the different scenarios described in reference to TABLE 1. At a test step 202, a determination is made whether a particular RDF group (X) is or is not asynchronous as discussed herein (for example, SRDF/A). If the RDF group is asynchronous then processing proceeds to a test step 204 where a determination is made whether the asynchronous RDF group is busy. If the asynchronous RDF group is busy then processing proceeds to a test step 206 where a determination is made whether there are any synchronous RDF groups being serviced by the same RA as servicing the asynchronous RDF group X. If there are synchronous groups on the RA then processing proceeds to a test step 208 at which is determined if the average weight of the synchronous RDF groups (Average\_Weight$_{QUEUE}$) does not equal zero. If Average\_Weight$_{QUEUE} \neq 0$ then processing proceeds to a step 210 at which Equation 3 is applied.

If at the test step 202 it is determined that the RDF group (X) is asynchronous then processing proceeds to a step 220 at which Equation 2 is applied. If at the test 204, it is determined that the asynchronous RDF group X is not busy then processing proceeds also to the step 220 where Equation 2 is applied. If at the test step 206 it is determined that there are no synchronous RDF groups are the RA then processing proceeds to a step 230 where Equation 4 is applied. If at the test step 208, it is determined that the average weight of the synchronous RDF groups equals 0 then processing also proceeds to the step 230 at which Equation 4 is applied.

In the example described in TABLE 1, the DP parameter may be given a default setting of 10, which would give the same priority for the asynchronous RDF groups and the synchronous RDF groups. The default value may be adjusted as appropriate, for example by a user and/or an administrator. In an embodiment, a DP parameter of 0 would indicate highest priority, whereas a DP parameter of 20 would indicate lowest priority. The weighting factor for the DP parameter is shown in TABLE 1 as logarithmic; however, other weighting factor implementations are possible.

It is noted that the system described herein allows for establishing a polling priority between different asynchronous RDF groups on the same RA, even if all the RDF groups on the RA are asynchronous groups. It should also be noted that, as evident from the above, Equation 1 and Table 1 are applicable to an RA in which only synchronous RDF groups are present. In this case, as indicated by Equation 1 and Table 1, the weight of each synchronous RDF group may be determined according to length of the workload queue using appropriate techniques. Additionally, in other embodiments, a semi-synchronous RDF group, as discussed elsewhere herein, may be treated as a synchronous group in conjunction with determining dynamic priority weights according to the analysis described herein. In various other embodiments, transfer modes other than synchronous and asynchronous discussed above may be implemented in conjunction with the system described herein in accordance with known techniques and standards.

Figure 7:
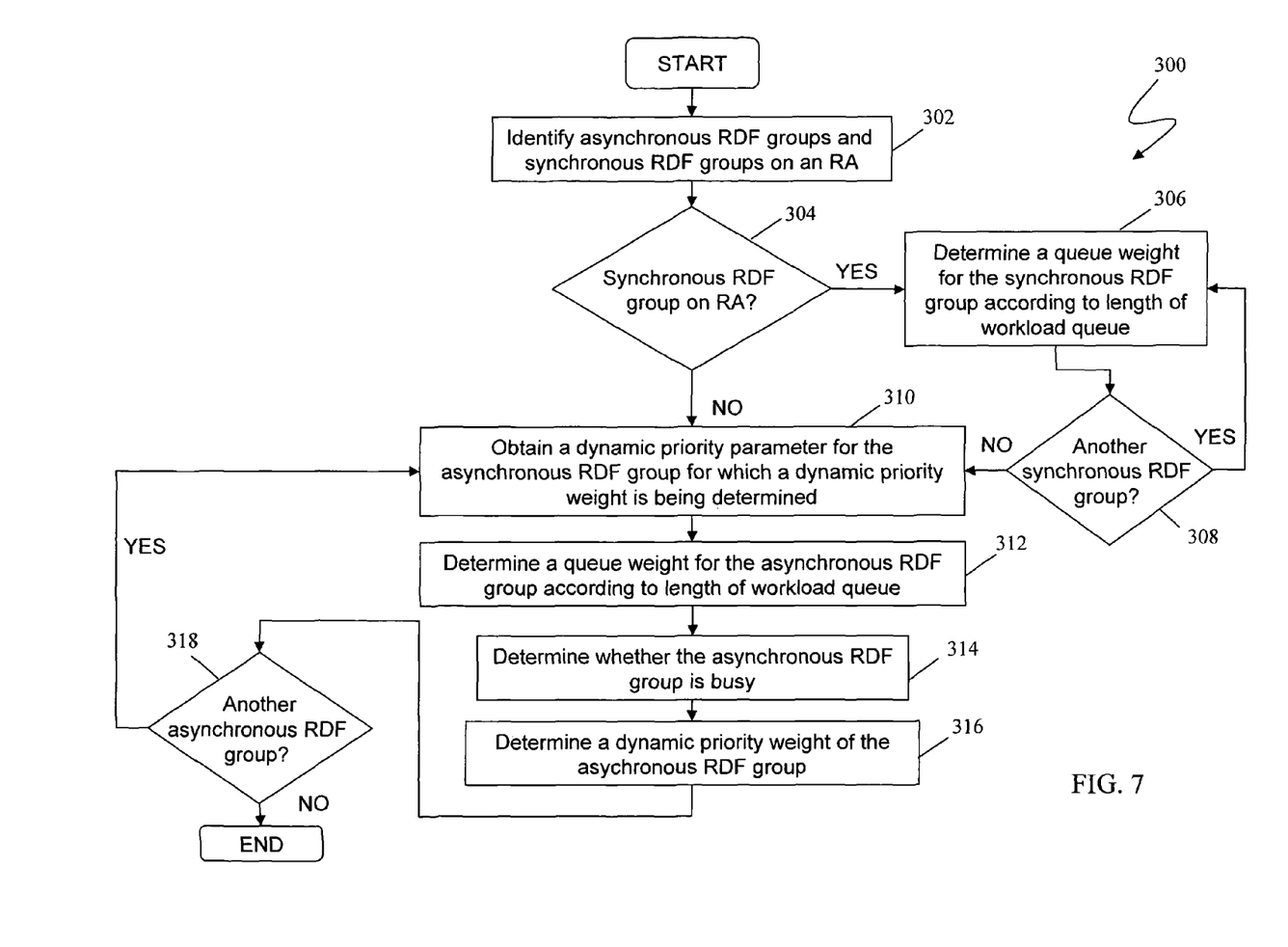
FIG. 7 is a flow diagram showing the determining of a dynamic priority weight for an asynchronous RDF group in connection with an embodiment of the system described herein.

FIG. 7 is a flow diagram 300 showing the determining of a dynamic priority weight for an asynchronous RDF group according to an embodiment of the system described herein and in accordance with the step 102 of FIG. 5. At a step 302, asynchronous RDF groups and synchronous RDF groups on an RA are identified. After the step 302, processing proceeds to a test step 304 where a determination is made whether there at least one synchronous RDF group on the RA. If there is a synchronous RDF group, then processing proceeds to a step 306 where a queue weight is determined for the synchronous RDF group according to the length of the workload queue of the synchronous RDF group. After the step 306, at a step 308 it is determined whether is another synchronous RDF group on the RA. If there is another synchronous RDF group then processing proceeds back to the step 306. If there is not another synchronous RDF group, then processing proceeds to a step 310. Also, at the test step 304, if there is no synchronous RDF group then processing proceeds to the step 310.

At the step 310, a dynamic priority (DP) parameter is obtained. As discussed in more detail elsewhere herein, the DP parameter may be configured by a user, either previously or currently with the process for assigning a weight to the asynchronous RDF group, and/or the DP parameter value may be configured by an administrator for a specific weight assigning procedure, and/or the DP parameter may be a default value configured at a system-wide level. After the step 310, processing proceeds to a step 312 at which a queue weight is determined for the asynchronous RDF group for which the dynamic priority weight is being determined.

After the step 312, processing proceeds to a step 314 where it is determined whether the asynchronous RDF group is busy, as discussed elsewhere herein. After the step 314, processing proceeds to a step 316 where the dynamic priority weight is determined for the asynchronous RDF group. In an embodiment, the dynamic priority weight is determined using Equation 1, the Equations 2, 3, 4 shown in. Table 1 and information obtained from the prior processing steps, as further discussed elsewhere herein. After the step 316, processing proceeds to a test step 318 at which it is determined if a dynamic priority weight is to be determined for another asynchronous RDF group on the RA. If a dynamic weight is to be determined for another asynchronous RDF group then processing proceeds back to the step 310. Otherwise, after the test step 318, processing is complete.

In various embodiments, dynamic priority weights may be recalculated periodically after a certain fixed period of time has elapsed. Alternatively, the dynamic priority weights of some or all of the groups may be recalculated whenever a new group is added and/or when a specified number of jobs in a workload queue are completed and/or whenever there is a specific change in queue length of one or more of the groups, for example, according to a predetermined threshold. Other trigger events are possible for recalculating dynamic priority weights. For example, a trigger event for recalculating dynamic priority weights may be after each cycle switch, as further discussed elsewhere herein.

In an embodiment, the system described herein may include a system having at least one processor that performs the above-noted steps. For example, the RA 60 may include a priority processor that determines priority of writes from the local storage device 24 and to the remote storage device 26, as discussed herein. Further, executable code, stored in a computer-readable medium, may be provided for carrying out the above-noted steps.

Figure 8:
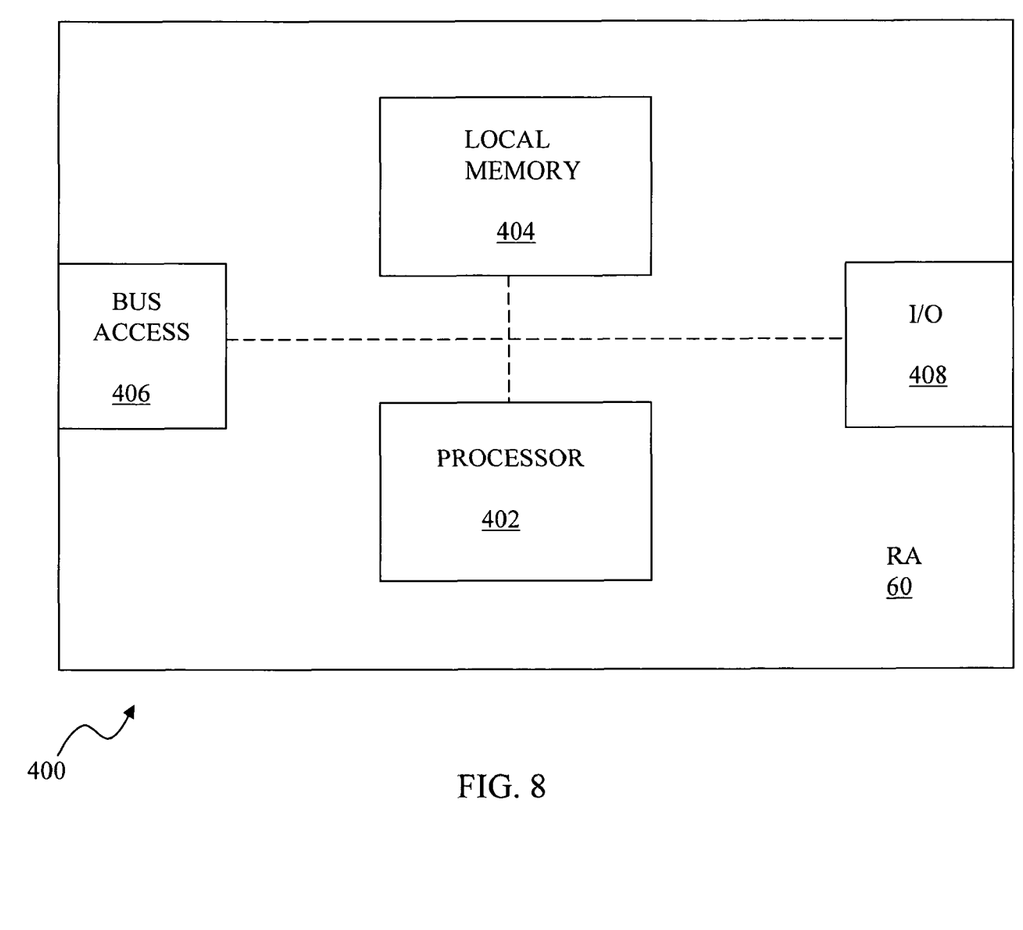
FIG. 8 is a schematic diagram showing an example of an RA of a local storage device that includes a processor, a memory, a bus access, and an I/O interface in connection with an embodiment of the system described herein.

FIG. 8 is a schematic diagram showing an implementation 400 of an embodiment of an RA 60 is shown as containing a processor 402, a memory 404, a bus access 406, and an I/O interface 408. The RA 62 of the remote storage device 26 may be similarly configured. The processor 402 may perform the functions for the RA 60, discussed herein. The memory 404 may be coupled to the processor 402 and contain local data used by the RA 60. The memory may include volatile portions that are read to and written from by the processor 402 and non-volatile portions that contain data used by the processor 402.

The I/O 408 represents interface circuitry for receiving data for the RA 60 and sending data from the RA 60 via, for example, the RDF link 29. The I/O 408 is coupled to the processor 402 and controlled by the processor 402 in connection with input and output operations. Similarly, the bus access circuitry 406 may also be coupled to and controlled by the processor 402. The bus access circuitry 406 provides access for the RA 60 to the bus of the storage device 24 in order to transfer data between the RA 60 and other portions and devices of the storage device 24, such as the data volumes 51 and 55 and/or memory 37.

The RA 60 causes input and output operations to be performed in connection with transferring data from the local storage device 24 to the remote storage device 26. The creation, manipulation, and structure of the jobs in a workload queue is further discussed elsewhere herein. The processor 402 may include a priority processor and/or dedicated software that determines the priority weights of RDF groups with queues awaiting processing, as discussed in detail elsewhere herein. It should also be noted that other implementations of the RA 60 are possible. Further, it is possible for the system describe herein to be used conjunction with a system in which multiple job records associated with a particular RA are made serviceable by other RAs or other entities, as further discussed in U.S. patent application Ser. No. 09/891,143, filed Jun. 25, 2001 to Kamvysselis, et al., incorporated herein by reference.

Note also that other types of data transmission may be incorporated into the system described herein. For example, a semi-synchronous transfer mode, as discussed elsewhere herein, may be used with the above-noted systems and/or asynchronous data transfer that is not SRDF/A may be used. The use of other data transfer modes (and combinations thereof) with the system described herein may be appropriately characterized and implemented using the equations and algorithms described herein, as will be appreciated by one of ordinary skill in the art. It is noted that although SRDF and RDF systems and devices may be referenced herein, the system described herein may be used with other appropriate data transfer systems and techniques.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A system for dynamic balancing of writes between multiple storage devices, comprising:
   a first storage device;
   a second storage device; and
   at least one processor that determines priority of writes from the first storage device to the second storage device, wherein the at least one processor identifies a transmission mode group type for each of at least two groups requesting a write from a first storage device to a second storage device and determines a priority weight for at least one of the at least two groups according to a dynamic priority parameter and information corresponding to the group type of each of the at least two groups, wherein the priority weight corresponds to an order in which the write request is serviced, wherein each of the at least two groups is at least one of: a first group type and a second group type different from the first group type, and wherein the information corresponding to the group type of the at least two groups includes a ratio of a number of groups of the first type and a number of groups of the second type, the priority weight being determined dynamically using the ratio of the number of groups of the first type and the number of groups of the second type and wherein the at least one processor:
   determines an average queue weight of all groups of the first group type, wherein the average queue weight is based on a queue length of each group of the first group type; and
   determines the priority weight for at least one group of the second group type, wherein the priority weight for the at least one group of the second group type is determined using the dynamic priority parameter and the information corresponding to the group type of each of the at least two groups and further using the average queue weight of all groups of the first group type.

2. The system as recited in claim 1, wherein at least one of the at least two groups requesting data transfer is a group of a synchronous transmission mode group type and at least another of the at least two groups requesting data transfer is a group of an asynchronous transmission mode group type.

3. A method for dynamic balancing of data transfer, comprising:
   identifying a transmission mode group type for each of at least two groups requesting data transfer from a first storage device to a second storage device;
   determining a priority weight for at least one of the at least two groups according to a dynamic priority parameter and information corresponding to the group type of each of the at least two groups, wherein the priority weight corresponds to an order in which a data transfer request is serviced, wherein each of the at least two groups is at least one of: a first group type and a second group type different from the first group type, and wherein the information corresponding to the group type of the at least two groups includes a ratio of a number of groups of the first type and a number of groups of the second type, the priority weight being determined dynamically using the ratio of the number of groups of the first type and the number of groups of the second type;
   determining an average queue weight of all groups of the first group type, wherein the average queue weight is based on a queue length of each group of the first group type; and
   determining the priority weight for at least one group of the second group type, wherein the priority weight for the at least one group of the second group type is determined using the dynamic priority parameter and the information corresponding to the group type of each of the at least two groups and further using the average queue weight of all groups of the first group type.

4. The method as recited in claim 3, wherein at least one of the at least two groups requesting data transfer is a group of a synchronous transmission mode group type and at least another of the at least two groups requesting data transfer is a group of an asynchronous transmission mode group type.

5. The method as recited in claim 4, wherein the asynchronous transmission mode group type includes transmission of data chunks, wherein a first chunk of data is transmitted asynchronously following asynchronous transmission of a second chunk of data.

6. The method as recited in claim 3, wherein the at least two groups requesting data transfer are each serviced by a same adapter on at least one of the first storage device and the second storage device.

7. The method as recited in claim 3, wherein the dynamic priority parameter is a scalar value of a logarithmic factor.

8. The method as recited in claim 3, wherein the dynamic priority parameter is set by at least one of: a user and an administrator.

9. The method as recited in claim 3, further comprising:
   determining a queue weight for at least one group of the at least two groups according to a length of a workload queue of the group.

10. The method as recited in claim 3, further comprising:
    determining if a group is busy.

11. Computer software, stored on a non-transitory computer-readable medium, comprising:
    executable code that identifies a transmission mode group type for each of at least two groups requesting data transfer from a first storage device to a second storage device;
    executable code that determines a priority weight for at least one of the at least two groups according to a dynamic priority parameter and information corresponding to the group type of each of the at least two groups, wherein the priority weight corresponds to an order in which a data transfer request is serviced, wherein each of the at least two groups is at least one of: a first group type and a second group type different from the first group type, and wherein the information corresponding to the group type of the at least two groups includes a ratio of a number of groups of the first type and a number of groups of the second type, the priority weight being determined dynamically umber of groups of the first type and the number of groups of the second type;

executable code that determines an average queue weight of all groups of the first group type, wherein the average queue weight is based on a queue length of each group of the first group type; and executable code that determines the priority weight for at least one group of the second group type, wherein the priority weight for the at least one group of the second group type is determined using the dynamic priority parameter and the information corresponding to the group type of each of the at least two groups and further using the average queue weight of all groups of the first group type.

12. The computer software as recited in claim 11, wherein at least one of the at least two groups requesting data transfer is a group of a synchronous transmission mode group type and at least another of the at least two groups requesting data transfer is a group of an asynchronous transmission mode group type.

13. The computer software as recited in claim 11, wherein the dynamic priority parameter is a scalar value of a logarithmic factor.

14. The computer software as recited in claim 11, further comprising:
   executable code that determines a queue weight for at least one group of the at least two groups according to a length of a workload queue of the group.

15. The computer software as recited in claim 11, further comprising:
   executable code that determines if a group is busy.

* * * * *